United States Patent
Acikgoez et al.

(10) Patent No.: US 10,217,978 B2
(45) Date of Patent: Feb. 26, 2019

(54) ENERGY STORAGE DEVICE ARRANGEMENT INCLUDING RECEIVING PARTS HAVING THROUGH OPENINGS FOR LASER ENERGY

(71) Applicant: AUDI AG, Ingolstadt (DE)

(72) Inventors: Erdal Acikgoez, Reichertshofen (DE); Jörg Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/516,767

(22) PCT Filed: Sep. 3, 2015

(86) PCT No.: PCT/EP2015/001776
§ 371 (c)(1),
(2) Date: Apr. 4, 2017

(87) PCT Pub. No.: WO2016/055133
PCT Pub. Date: Apr. 14, 2016

(65) Prior Publication Data
US 2017/0331085 A1    Nov. 16, 2017

(30) Foreign Application Priority Data
Oct. 7, 2014    (DE) .................. 10 2014 014 850

(51) Int. Cl.
*H01M 2/10*    (2006.01)
*H01M 2/20*    (2006.01)

(52) U.S. Cl.
CPC ......... *H01M 2/1077* (2013.01); *H01M 2/206* (2013.01); *H01M 2220/20* (2013.01)

(58) Field of Classification Search
CPC .................. H01M 2/1077; H01M 2/206
(Continued)

(56) References Cited

U.S. PATENT DOCUMENTS

2009/0297892 A1    12/2009  Ijaz et al.
2016/0172642 A1*   6/2016   Hughes ............... H01M 2/1077
                                                  429/90

FOREIGN PATENT DOCUMENTS

CN    102047471 A    5/2011
CN    203091972 U    7/2013
(Continued)

OTHER PUBLICATIONS

Hochreiter Georg, Machine translation of WO-2013134808-A1, Sep. 2013 (Year: 2013).*

(Continued)

*Primary Examiner* — Sean P Cullen
(74) *Attorney, Agent, or Firm* — Maier & Maier, PLLC (57) ABSTRACT

An energy storage device arrangement, including a plurality of electrical energy storage devices that are mutually electrically contacted with each other, including a first receiving part having at least one bore-like receiving space for receiving at least one electrical energy storage device, at least one other receiving part connectable with the first receiving part, provided with at least one bore-like receiving space for receiving at least one electrical energy storage device, and at least one plate-like connecting part that is or can be arranged between two receiving parts that are or can be arranged adjacently for electrical contacting of electrical energy storage devices arranged in respective receiving spaces on the side of the receiving part.

11 Claims, 4 Drawing Sheets

(58) Field of Classification Search
USPC .......................................................... 429/159
See application file for complete search history.

(56) References Cited

FOREIGN PATENT DOCUMENTS

| | | | | | |
|---|---|---|---|---|---|
| CN | 203536498 | U | | 4/2014 | |
| DE | 10122682 | A1 | | 11/2001 | |
| DE | 102011015620 | A1 | | 10/2012 | |
| DE | 102011101022 | A1 | | 11/2012 | |
| DE | 102012200591 | A1 | | 7/2013 | |
| JP | 2011216366 | A | * | 10/2011 | |
| WO | 2010/142679 | A1 | | 12/2010 | |
| WO | 2013/087196 | A1 | | 6/2013 | |
| WO | 2013134808 | A1 | | 9/2013 | |
| WO | WO-2013134808 | A1 | * | 9/2013 | .......... H01M 2/1077 |

OTHER PUBLICATIONS

Fukumori, Junichi, Machine Translation of JP 2011-216366 A, Oct. 2011 (Year: 2011).*
Notification of Transmittal of Translation of the International Preliminary Report on Patentability (Chapter I or Chapter II) dated Apr. 20, 2017, in connection with corresponding international application No. PCT/EP2015/001776 (7 pgs.).
German Office Action dated Jun. 15, 2015 of corresponding application No. 10 2014 014 850.5; 5 pgs.
International Search Report and Written Opinion dated Dec. 2, 2015 of corresponding application No. PCT/EP2015/001776; 15 pgs.
Chinese Office Action dated Jan. 17, 2018 of corresponding Chinese application No. 201580054356.6; 7 pgs.

* cited by examiner

ENERGY STORAGE DEVICE ARRANGEMENT INCLUDING RECEIVING PARTS HAVING THROUGH OPENINGS FOR LASER ENERGY

BACKGROUND

The invention relates to an energy storage device arrangement comprising a plurality of electrical energy storage devices that can be mutually electrically connected or contacted.

Multiple arrangement of electrical energy storage devices of this type are known from prior art and they are used for example in the area of motor vehicle technology for supplying electrical energy to users on the side of the motor vehicle. Under the term an electrical energy storage device is to be understood an energy storage cell that is accommodated in a housing for an energy storage cell.

A known example of such an energy storage device arrangement provides a certain spatial arrangement of several cylindrical energy storage devices, which is to say electrically contacted energy storage devices provided with a round cross-section. The electrical storage devices can in this case be based for example on lithium or on a lithium compound.

The above-mentioned electrical contacting of respective electrical energy storage devices takes place within the context of manufacturing of corresponding energy storage device arrangements and it is relatively complex in terms of manufacturing technology. Furthermore, due to production-related limitations connected with electrical contacting of respective electrical energy storage devices, only certain arrangements of corresponding electrical storage devices are as a rule possible, which may preclude a space-optimized arrangement of corresponding electrical energy storage devices.

Therefore, there is a need for an every storage device arrangement that can be produced in a simple manner and that is in particular space-optimized,

SUMMARY OF THE DISCLOSURE

The object of the invention is to provide an energy storage device arrangement that can produced in a simple manner and manufactured with a space-optimized design.

The objective is achieved with an energy storage device arrangement of the type mentioned in the introduction, which is characterized in that it is formed with a first receiving part that is provided with at least one bore-like receiving space for receiving at least one electrical energy storage device, and further provided with at least one receiving part that can be connected or is further connected to the first receiving part equipped with at least one bore-like receiving space, and at least one plate-like electrical connecting part that is or can be arranged between two adjacent connecting parts for electrical contacting of electrical energy storage devices arranged in respective receiving spaces on the receiving-part side, wherein the electrical energy storage devices are or can be arranged in respective receiving spaces on the receiving-part side in such a way that the contacting poles of respective energy-side storage devices are exposed, so that they are or can be contacted, wherein at least one separate through-opening is formed in the respective receiving parts for the passage of laser energy, in particular laser radiation, for the formation of respective electrical contacting poles on the side of the energy storage devices, connected with contacting regions which can be or are arranged between the receiving parts that are formed or can be formed between adjacent plate-like electrical connecting parts or regions to be contacted in a integrally joined manner.

The energy storage device arrangement generally comprises a plurality of electrical energy storage devices, abbreviated as energy storage devices. Under the term energy storage device is generally understood an energy storage cell. A corresponding energy storage cell is typically accommodated in an energy storage device housing. With regard to electrochemically active components, a corresponding energy storage device can be based for example on lithium; therefore, lithium or a lithium compound can form a relevant electrochemical constituent of a corresponding energy storage device.

The energy storage device arrangement can be used in the area of motor vehicle technology for supplying electrical energy to users on the side of the vehicle, and in particular it is understood also as an electromotive drive of the motor vehicle.

The energy storage device arrangement comprises a first receiving part and at least one other receiving part, which is to say generally at least two receiving parts. The other receiving part can be connected with the first receiving part, or it is connected with it in the properly assembled state of the energy storage device arrangement. In the assembled state of the at least two receiving parts, the receiving parts are arranged adjacently, which is to say that at least one surface section of the first receiving part is arranged opposite at least one surface section of the other receiving part. In principle, all the receiving parts of the energy storage device arrangement can be correspondingly or properly connected to each other, or connected to each other in the duly mounted state of the energy storage device arrangement.

The first receiving part is equipped with at least one bore-like receiving part for accommodating at least one energy storage device. Under the term bore-like is here to be understood an opening that completely covers the receiving part between two opposite outer surfaces, in particular base surfaces of the first receiving part. A corresponding first receiving part can be provided with a cube-shaped design. The respective bore-like receiving spaces are in this case designed so as to extend transversely with respect to their longitudinal extent through each first receiving part in an angular manner, in particular perpendicularly, to the respective receiving-side base surfaces.

The geometrical shape, which is to say the dimensions, form and cross-section of the opening is typically matched to the geometrical shape, which is to say in particular to the measurements, the form and the cross-section of an energy storage devices to be accommodated in the receiving spaces of the first receiving part. Typically, an energy storage device is or can be arranged so that it fits precisely into the receiving space on the receiving-part side of the first receiving part.

Typically, the first receiving part comprises several bore-like receiving spaces. The receiving spaces can be arranged in a matrix-like manner and distributed in several rows and columns.

Specifically, for instance four receiving spaces that are arranged horizontally next to each other can form a row, and for example four receiving spaces arranged under each other can form a column. A matrix-like arrangement of corresponding receiving spaces can thus comprise for example four horizontal rows arranged one below each other, or four vertical columns arranged next to each other.

The or generally a further receiving part is also provided with at least one bore-like receiving space for accommodating at least one energy storage device. The term a bore-like receiving space is in this context to be understood as an opening that passes through another receiving part between two opposite outer surfaces, in particular base surfaces. A corresponding further receiving part can also have a cube-shaped form. The respective bore-like receiving spaces are in this case typically formed so as to extend transversely with respect to their longitudinal extent through each first receiving part in an angular manner, in particular perpendicularly to the respective receiving-side base surfaces of the receiving parts.

The geometrical design, which is to say in particular the dimensions, the form and the cross-section of the opening, is typically adapted to the geometrical shape, which is to say in particular to the dimensions, form and cross-section of an energy storage device to be arranged in another receiving part. Typically, an energy storage device thus is or can be arranged in the receiving-side receiving space of another receiving part.

Typically, the or generally a further receiving part comprises also several bore-like receiving spaces. These can be also arranged distributed in a matrix-like manner in several rows and columns. The embodiments of the matrix-like arrangement of corresponding bore-like receiving spaces are analogous in this context to the first receiving part.

The number of respective bore-like receiving spaces of the first receiving part typically corresponds to the number of the respective bore-like receiving spaces of the or generally a further receiving part.

The energy storage device arrangement is in addition to the at least two receiving parts associated with at least one plate-like or plate-shaped electrical connecting part, abbreviated as connecting part. The connecting part is to be arranged between two receiving parts, or in the properly mounted state of the energy storage device arrangement, between two receiving parts arranged adjacently. The connecting part is thus provided with a surfaces section or upper side facing first receiving part, and with a surface section or lower side facing another receiving part located opposite. The connecting part is used from the functional viewpoint to create an electrical contact between the respective energy storage devices that are arranged in the receiving spaces on the receiving-part side, or that are arranged in the energy storage device arrangement in the properly mounted state.

For this purpose, the energy storage devices can be or are arranged in the respective receiving-side receiving spaces in such a way that the respective contacting poles (cell poles) of the energy storage devices, which is to say typically one plus pole and one minus pole, are exposed. The energy storage devices can thus be or are typically arranged in the longitudinal direction relative to their longitudinal axis on the receiving-side, or in the properly mounted state of the energy storage device arrangement. Accordingly, the contacting poles of the energy storage devices on the receiving-part side of the contacting poles of the energy storage device are contacted with a corresponding receiving part, or are contacted with a corresponding connecting part in the properly assembled state of the energy storage device arrangement. The contacting causes a mechanical as well as an electrical connection of respective contacting poles on the side of the energy storage devices with the contacting part, wherein a contact with the respective poles of the connecting part is created as an integrally joined connection. The integrally joined connection or contacting is in particular a welded connection. A corresponding welded connection can be produced for example with laser beam welding. However, it would be also conceivable to produce the welded connection by means of other welding methods, which is to say for example with ultrasonic welding or with resistance welding.

In the receiving parts is formed in each case at least one separate through-passage opening, which is provided on the receiving-part side to enable through passage of laser energy, in particular laser beams, specifically separately or additionally to the receiving spaces. The laser energy passing through a corresponding through-passage opening serves for the formation of respective contacting poles for contacting in an integrally joined manner the respective contacting poles with the contacting regions part on the receiving-part side, and thus it is used to create the integrally joined contact described above of corresponding energy storage device-side contacting poles with a corresponding contacting part.

Under passage opening is here to be understood a fully penetrating opening created for the respective receiving parts between two opposite outer surfaces, in particular base surfaces. The geometrical design, which is to say in particular the dimensions, the form and the cross-section of individual openings, is in this case adapted to match the geometrical design, which is to say in particular the dimensions, the form an the cross-section of a laser beam or beams passing through the openings. The geometrical design of respective openings can be similar to the geometrical design of respective receiving spaces. Typically, although definitely not necessarily, the respective through-passage openings on the receiving-part side have a smaller cross-sectional surface in comparison to that of the receiving spaces.

The respective receiving parts typically comprise a plurality of through-passage openings. The number of the respective through-passage openings on the receiving-part side typically corresponds to the number of the respective bore-like receiving spaces on the receiving-part side. Accordingly, the number of the respective through-passage openings of the first receiving part typically corresponds to the number of the respective through-passage openings of the or generally a further receiving part.

The respective through-openings on the receiving-part side can be also arranged distributed in a matrix-like manner in a plurality of rows and columns. Specifically, for example four receiving spaces arranged horizontally next to each other form a row, and for example four vertically receiving spaces arranged vertically below each other form a column. A matrix-like arrangement can thus comprise for example four horizontal rows arranged below each other, or four columns arranged vertically next to each other.

The described principle therefore makes it possible to realize an energy storage device arrangement in a simple manner, and in particular with an optimized, space-saving design.

The described principle is suitable in particular for energy storage devices having a cylindrical design, which is to say for energy storage devices provided with a (circular) round cross-section. In the case of corresponding energy storage devices, each contacting pole of the energy storage device is typically formed and arranged so that it is located opposite the front sides of the energy storage device.

With regard to the arrangement of respective receiving-side receiving spaces, it is expedient when the at least one bore-like receiving space of the first receiving part is arranged offset relative to an adjacently arranged further receiving member in the connected state of the first receiving part, or relative to the at least one bore-like space of the further receiving part.

Through-passage openings of the first receiving part that are aligned in this manner, viewed axially, are aligned with the contacting poles of the energy storage device in the other receiving part. Accordingly, the integrally joined contact described above of respective contacting poles with a corresponding connecting part or the formation of corresponding contacting regions is thus made possible. Conversely, it is also expedient when the at least one bore-like receiving space of the other receiving part is arranged offset in the state when it is connected with the first receiving part or the adjacent receiving part, relative to the at least one bore-like receiving space of the first receiving part.

Furthermore, it is also practical when the through-passage openings on the side of the receiving part are arranged or formed in the case when the respective receiving parts are arranged or created with a plurality of through-passage openings in matrix-like manner in receiving spaces that are distributed in multiple rows and columns, so that they are offset relative to the receiving spaces. Respective through-passage openings on the receiving part-side extend advantageously parallel or are offset parallel relative to the receiving spaces on the receiving-part side.

In the connected state of the first receiving part, when it is connected with the or with another receiving part, mutually adjacently arranged surface sections of the first receiving part, as well as of another receiving part, can be advantageously formed or arranged between the first receiving part and another receiving part in order to form a plug-in connection of the corresponding connecting elements. With the interaction of the respective corresponding connecting elements, the formation of a plug-in connection thus enables a simple and correct positioning of respective adjacent receiving elements relative to each other.

Specifically, at least one receiving element is formed or arranged in the connected state of the first receiving part with another receiving element relative to the opposite surface section of the first receiving part, at least one connecting element is arranged in the form of a peg-like or pin-like or in the form of a plug or a plug receptacle. At least one corresponding connecting element can be formed or arranged in the connected state of the first connecting part with the other receiving part in the opposite surface section of another receiving part in the form of a peg-like or pin-like projection plug, in the form of a plug-in receptacle, or in the form of a peg-like or pin-like projection plug. It is of course also possible that the respective receiving parts as well as the connecting elements are formed or arranged also in the form of plug-in receptacles. Respective plug-in projections and respective plug-in receptacles thus form corresponding plug-in partners of a plug-in connection.

In the or generally a connecting element can be formed at least one indentation or recess for receiving an electrical contacting pole protruding from the energy storage device, typically a plus pole. In this manner, the correct arrangement of a corresponding connecting part relative to the corresponding contacting poles is thus simplified, and so is the overall assembly of the energy storage device arrangement. The indentation is expediently adapted to the design of the geometrical construction of the contacting poles.

With regard to the formation of an integrally joined connection, as was already mentioned, it is typically expedient when a welded connection is used so that at least one slot-like or slot-shaped opening is formed in the connecting part in the area of respective contacting regions. In this manner, an improved material flow is enabled, along with a safe process for manufacturing an integrally joined connection.

It has been mentioned that the energy storage device arrangement can essentially also comprise more than two receiving parts. In this case, there are different arrangement possibilities for respective receiving parts. A first receiving part and at least one other receiving part connected with it in the direction of the longitudinal axis of the receiving space on the side of the receiving part can in this case form a group of receiving parts. A plurality of such receiving part groups can be arranged parallel to the longitudinal axis of the first receiving part next to each other. The arrangement possibilities of the respective receiving parts pr receiving part groups can be in principle selected freely. The arrangement of the receiving parts or of the receiving part groups can be also selected individually, which is to say with regard to a specific field of application of the energy storage device arrangement, in order to create as much as possible an optimal arrangement of energy storage devices for a given applications, which is to say for example for a motor vehicle.

The receiving parts are typically formed from a material that is not electrically conductive. The respective connecting parts can thus be formed for instance from a plastic material. Suitable plastic materials are in particular thermoplastic materials such as ABS, PC, PBT, or mixtures (blends, compounds, etc.) of the materials named above.

The plastic materials can be at least partially transparent and thus permeable to laser energy or laser energy at a specific frequency and with a specific amplitude. Specific examples include for instance PC or PBT types of materials having a comparatively high transmission ratio, in particular above 70% in the visible light spectrum. The transmission of plastic materials or the selection of the plastic materials must be in this context defined on the basis of a specific amount of laser energy, or of its frequency and amplitude. In this case, an offset arrangement of respective receptacle-side receiving spaces or through-passage openings is not necessarily required because the laser energy can be in this case be guided through the respective receiving parts to the respective contacting regions to be formed.

In contrast to receiving parts, the connecting parts are typically formed from a material that is electrically conductive. The connecting part or connecting parts can thus be formed formed for example from a weldable metallic material. Suitable metals are for example aluminum, copper or nickel, or corresponding aluminum, copper or nickel alloys. It goes without saying that the use of weldable iron compounds or steels is also conceivable.

The invention further also relates to a motor vehicle, which comprises at least one arrangement of energy storage devices described above. The energy storage device arrangement can be used for supplying electricity to vehicle-side electricity consumers, which should be in particular understood to include also electromotive drive of motor vehicles.

In the context of the motor vehicle, in principle all the embodiments are also analogous also in the context of an energy storage device arrangement.

In addition, the invention also relates to a method for producing an energy storage device arrangement as described above. The method comprises the following steps:
  providing a first receiving part, at least one other receiving part, as well as at least one plate-like electrical connecting part to be arranged between the first receiving part and the at least one other receiving part,
  arranging respectively at least one electrical energy storage device in each respective receiving space on the receiving part side
  electrically contacting the exposed contacting poles of the at least one energy storage device arranged in the first receiving part with the plate-like electrically connecting part by forming a contacting region contacting in a integrally joined manner the contacting pole with the plate-like electrical connecting part by means of laser energy, in particular laser radiation, wherein the laser energy passes through the through-passage opening on the receiving part side, in particular on the side of the first receiving part, and electrically contacting the exposed contacting poles of the at least one energy storage device arranged in the other receiving part with the plate-like electrical connecting part by forming a contacting region, which contacts in a integrally joined manner the contacting pole with the plate-like electrical connection by means of laser energy, in particular laser radiation, wherein the laser energy passes through a through-opening on the receptacle side, in particular of the other receiving part.

Also in the context of the method, in principle all the embodiments relating to the energy storage device arrangement are analogous.

BRIEF DESCRIPTION OF THE DRAWINGS

Further advantages, features and details of the invention will become evident from the embodiments described below and from the attached figures, which show the following.

DETAILED DESCRIPTION OF THE DRAWINGS

Figure 1:
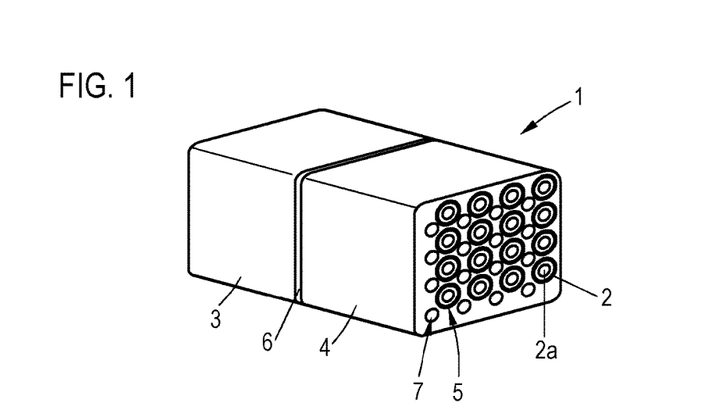
FIG. 1 the figures show a schematic representation of an energy storage device arrangement according to one embodiment of the invention.
Figure 2:
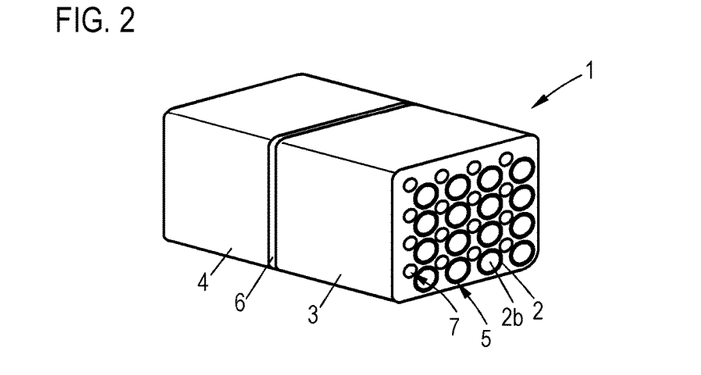
FIG. 2 the figures show a schematic representation of an energy storage device arrangement according to one embodiment of the invention.

FIG. 1, 2 shows a schematic representation of an energy storage device arrangement 1 according to an embodiment of the invention in a perspective view. The view of the energy storage device arrangement 1 shown in FIG. 1 is rotated by 180° as shown in the view of FIG. 2.

The energy storage device arrangement 1 serves for supplying electricity to a motor vehicle-side electricity consumer, such as for example an electromotive drive, and therefore it can be installed in a motor vehicle, (not shown).

Figure 5:
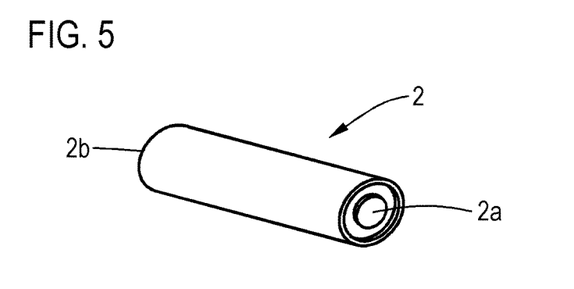
FIG. 5 a schematic representation of an energy storage device belonging to an energy storage device arrangement according to an embodiment of the invention.

The energy storage device arrangement 1 comprises a number of energy storage devices 2 which are in mutual contact with one another. Corresponding energy storage devices 2 are for example lithium-based energy storage cells that are accommodated in a cylindrical, which is to say round, energy storage cell housing. A corresponding view of an individual energy storage device 2 is shown in FIG. 5 as a perspective view. The respective front sides of a corresponding energy storage device 2 forming contacting poles 2a, 2b can be seen as shown in FIG. 5. The contacting pole 2a, formed as a projection on the upper end face, is the positive pole, the contacting pole 2b formed on the opposite front face, which is to say of the lower side as shown in FIG. 2, is the negative pole of the energy storage device 2.

Figure 3:
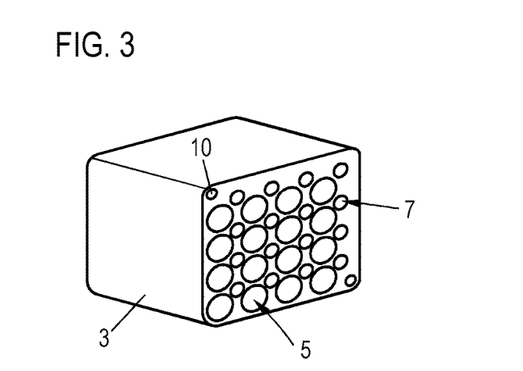
FIG. 3 the figures show a schematic representation of respective receiving parts belonging to an energy storage device arrangement according to an embodiment of the invention.
Figure 4:
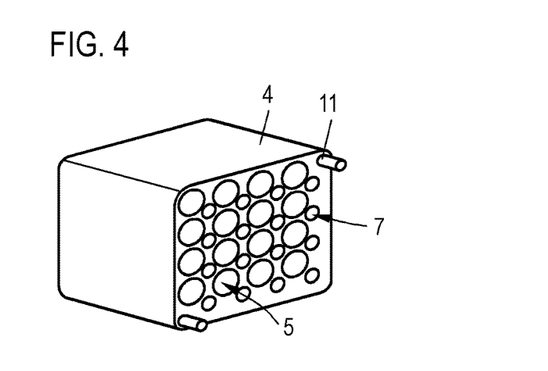
FIG. 4 the figures show a schematic representation of respective receiving parts belonging to an energy storage device arrangement according to an embodiment of the invention.

As one can see from FIG. 1, 2 in conjunction with FIG. 3, 4, the energy storage devices 2 associated with the energy storage device arrangement 1 are respectively arranged in two mutually connectable receiving parts 3, 4 which are connected to each other in the properly mounted state of the energy storage device arrangement 1 shown in FIG. 1, 2. The receiving parts 3, 4 are respectively provided with a cube-shaped form. In the following, the receiving part 3 will be referred to as "first receiving part, and the receiving part 4 will be referred to as "another receiving part".

It is apparent from the FIG. 1, 2 that both receiving parts 3, 4 are arranged adjacent to one another in the connected state. Accordingly, one surface section, here a base surface, of the first receiving part 3, is arranged opposite a surface section, here also a base surface, of another receiving part 4.

The first receiving part 3 is provided with a plurality of bore-like receiving spaces 5. Each receiving space 5 serves to accommodate an energy storage device 2. Under the term bore-like receiving space 5 is in this case meant a fully penetrating opening of the first receiving part 3 between two opposite outer surfaces, here base surfaces, of the first receiving part 3. The respective receiving spaces 5 are in this case formed with respect to their longitudinal extent so as to be extended transversely relative to the first receiving part 3, perpendicularly to the respective base surfaces on the receiving part side.

It is evident that the geometrical shape, which is to say in particular the dimensions, the shape and the cross-section of the receiving space 5 are adapted to the geometrical shape, namely in particular to the dimensions, the form and the cross-section of the respective energy storage devices 2 to be arranged in the respective receiving spaces 5. The energy storage devices 2 can thus be arranged to fit precisely into the respective receiving spaces 5 on the receiving-part side.

The receiving spaces 5 on the receiving-part side are arranged in a matrix-like manner distributed in a plurality of rows and columns. In the embodiments shown in the figures, four horizontally receiving spaces 5 arranged next to each other form a row, and four vertically arranged spaces 5 arranged below each other form a column. The matrix-like arrangement of the corresponding receiving spaces 5 thus comprises four rows arranged horizontally under each other, or four columns arranged vertically next to each other.

The other receiving part 4 is also provided with a plurality of bore-like receiving spaces 5. Also here, each receiving space 5 of the receiving space 5 serves for accommodation of an energy storage device 2. As one case seen in particular from FIGS. 1-4, the explanations above relating to the formation and arrangement of the receiving spaces 5 of the other receiving part 4 are applicable analogously also in the context of the receiving space 5 of the first receiving part 3.

It is evident in particular from FIG. 3, 4 that the number and the matrix-like arrangement of respective receiving spaces 5 of the first receiving part 3 basically correspond to the number and matrix-like arrangement of the respective receiving spaces 5 of the other receiving part 4.

The receiving parts 3, 4 are each formed from a material that is not electrically conductive, in this case from a plastic material such as for example ABS, PC, PBT or from mixtures of these materials. The plastic materials can be at least partially transparent and therefore at least partially permeable to laser energy or laser rays at a certain frequency and amplitude. Specifically, this is the case for example with PC or PBT types of materials, which enable a relatively high transmission, in particular above 70%, in the spectrum of visible light.

Figure 6:
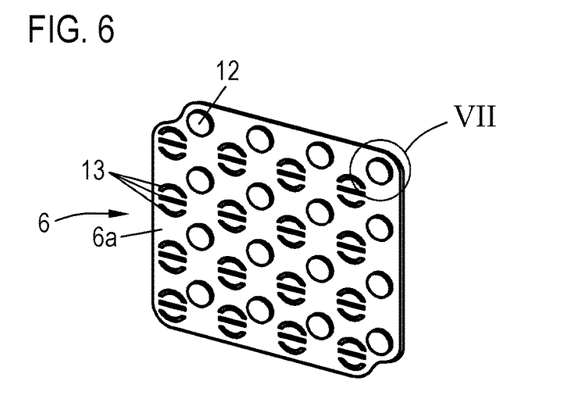
FIG. 6 the figures show a schematic representation of a plate-like electrical connecting part belonging to an energy storage device arrangement according to an embodiment of this invention.

In addition to the receiving parts 3, 4, the energy storage device arrangement is associated with a plate-like formed connecting part 6. This connecting part 6, which is shown separately in a perspective view in FIG. 6, is to be arranged between two adjacent receiving parts 3, 4 in the properly mounted state of the energy storage device arrangement 1, in which it is arranged between two adjacently arranged receiving parts 3, 4. The connecting part 6 is therefore provided with a surface section 6a facing the first receiving part 3, and with the upper side surface section 6 b facing the other receiving part 4 on the opposite side, or the bottom side. The connecting part 6 is functionally used for electrical contacting of the respective energy storage devices to be arranged in the receiving spaces 5 on the receiving-part side, or mounted in the properly mounted state of the respective energy storage devices 2 in the energy storage device arrangement 1.

The connecting part 6 is formed from a weldable, electrically conductive material, which is to say from a metal, for example from aluminum or an aluminum alloy.

Figure 7:
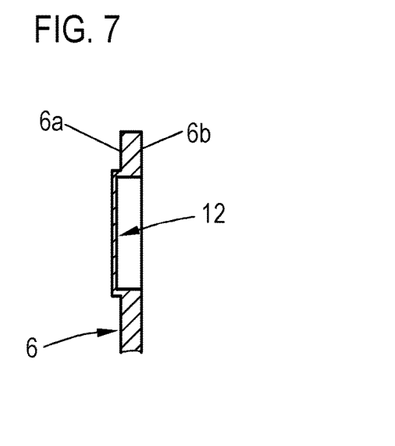
FIG. 7 the figures show a schematic representation of a plate-like electrical connecting part belonging to an energy storage device arrangement according to an embodiment of this invention.

As one can see from FIG. 6 and FIG. 7, which show an enlarged representation of the detail VII shown in FIG. 7, recesses or indentations 12 are formed for accommodating a contacting pole 2a, which is to say the plus pole, projecting from an energy storage device 2. In this manner, the correct arrangement of a corresponding connecting part 6 relative to the corresponding contacting poles 2a, 2b, and thus also of the entire assembly of the energy storage device arrangement 1, is simplified. The indentations 12 are adapted so as to match the geometrical design of the construction of the electrical contacting pole 2a.

As shown in FIG. 6, slot-shaped or slit-shaped perforations 13 are further also formed in the connecting part 6. These perforations 13 serve for formation of corresponding process-proof, which is to say soldered contacting regions 9 formed between respective energy storage device-side contacting poles 2a, 2b, and for formation of the connecting part 6, or for formation of a process-proof, integrally joined, which is to say soldered connection.

As one can see in particular from FIG. 1, 2, the energy storage devices 2 are or can be arranged in the respective receiving-part side receiving spaces 5 in such a way that the respective energy storage device-side contacting poles 2a, 2b are exposed. The energy storage devices therefore are or can be arranged in the longitudinal direction relative to their longitudinal axis in the receiving spaces 5. Accordingly, the energy storage device-side contacting poles 2a, 2b are or can be contacted with the connecting part 6 in the state when the connecting part 6 is or can be contacted, or in the correctly mounted state of the energy storage device arrangement 1. The contacting presumes a mechanical or an electrical connection between the respective energy storage device-side contacting poles 2a, 2b with the connecting part 6, and it is thus realized via an integrally joined connection, which is to say via a welded connection. The welded connection is here manufactured by welding with laser rays. However, it would be also conceivable to manufacture the welding connection with another welding method, which is to say for example with ultrasonic welding or with resistance welding.

Figure 8:
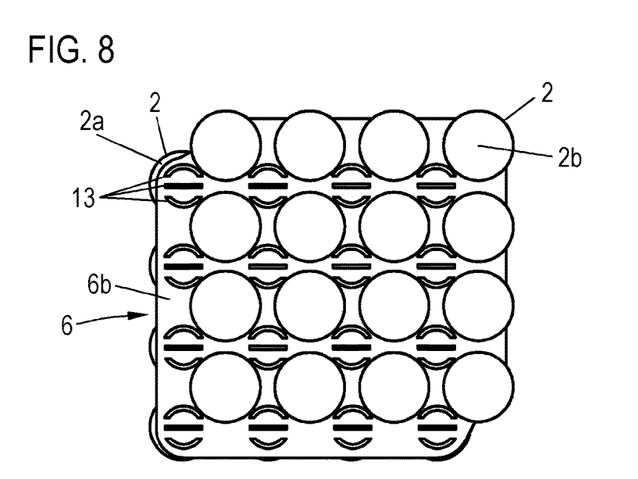
FIG. 8 the figures show a schematic representation of an arrangement of respective energy storage devices in two respective connecting parts mutually connected to each other without a connecting part.

It is evident in particular from FIG. 3, 4 that several separate, which is to say separated through-passage openings 7 are created in the receiving parts 3, 4 separately, which is to additionally to the respective receiving spaces 5. The through-passage openings 7 are used to enable through-passage of the laser energy 8, which is to say in particular laser radiation (see FIG. 9, 10, which in addition to FIG. 8 shows a schematic representation of the arrangement of the respective energy storage devices in two receiving parts 3, 4 mutual connected to each other without the respective receiving parts 3, 4).

It is evident in particular from FIG. 3, 4 that under the term through-passage opening 7 is to be understood an opening that is fully penetrating between two opposite outer surfaces, in this case base surfaces. Its geometrical form, which is to say in particular the dimensions, the shape and the cross-section of the geometrical form is adapted to laser beams or fluxes of laser beams passing through it. It is evident that the geometrical form of each through-passage opening 7 is similar to the geometrical form of respective receiving spaces 5. However, the through-passage openings 7 are here provided with a smaller cross-section in comparison to the receiving spaces 5.

From the FIG. 3, 4 it can be further also seen that the number and the arrangement of respective through-passage openings 7 on the receiving-part side basically correspond to the number and the arrangement of the respective through-passage openings on the receiving-part side of the receiving spaces 5. This is due to the fact that the through-passage openings 7 are also arranged so that they are distributed in a matrix-like manner in corresponding rows and columns.

It can be further also seen from FIG. 3, 4 that the respective through-passage openings 7 on the side of the receiving parts are arranged offset with respect to the respective receiving-side receiving spaces 5. The respective receiving-side through-passage openings 7 extend parallel or are offset parallel to the respective receiving-side receiving spaces 5.

Figure 9:
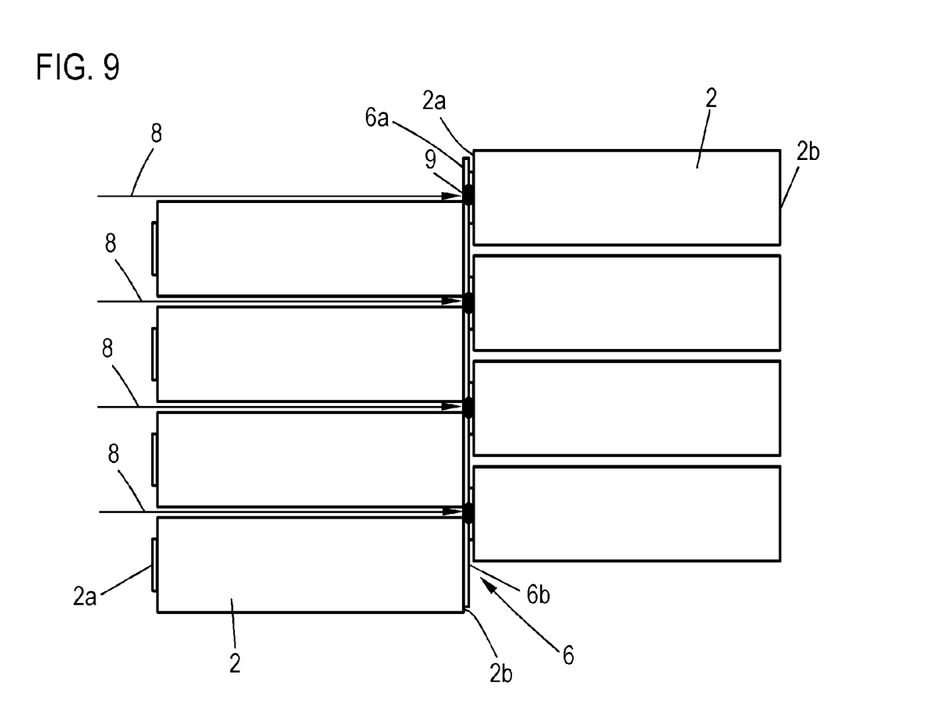
FIG. 9 the figures show a schematic representation of an arrangement of respective energy storage devices in two respective connecting parts mutually connected to each other without a connecting part.
Figure 10:
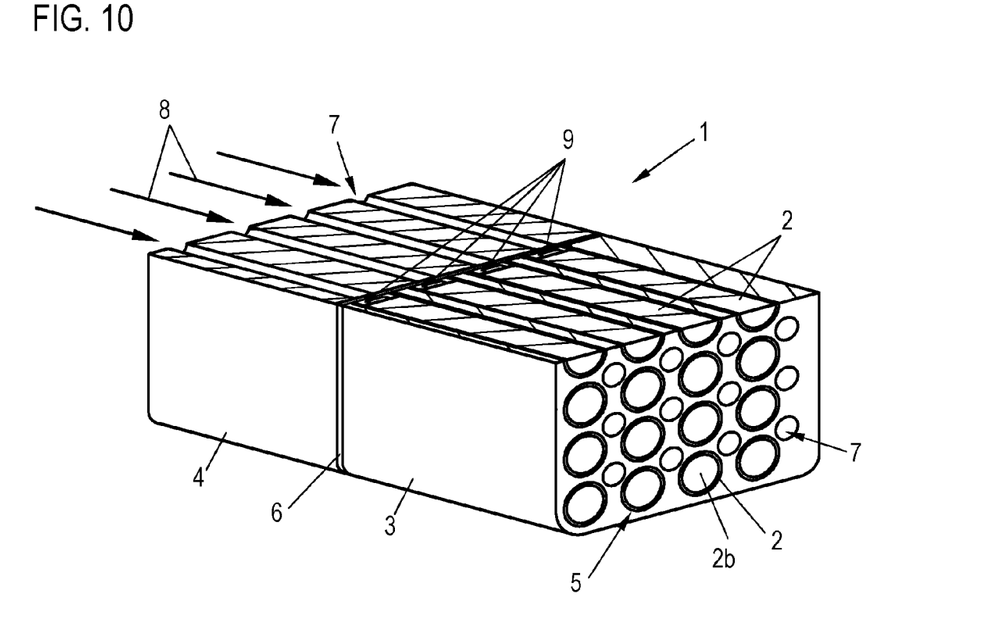
FIG. 10 the figures show a schematic representation of an arrangement of respective energy storage devices in two respective connecting parts mutually connected to each other without a connecting part.

The laser energy 8 passing through the corresponding through-passage openings 7 serves to form contacting regions 9, which create contact with the connecting part 6 the contacting poles 2a, 2b in the integrally joined manner described above so as to contact respective contacting poles 2a, 2b on the energy storage device-side with the connecting part 6 (see FIGS. 8-10). Since the integrally joined contacting is created as a welded connection, the contacting regions 9 are typically represented by weld points or weld seams. The contacting regions 9 can be formed with a circular shape or with a cross shape. The contacting regions 9 can absorb the forces or the moment acting on the energy storage device arrangement 1, for example when they are being installed in a motor vehicle.

As was already mentioned, FIGS. 8-10 show a schematic representation of the arrangement of respective energy storage devices 2 in two mutually connected receiving parts 3, 4, without the respective receiving parts 3, 4, wherein FIG. 8 shows a front view, FIG. 9 shows a top view and FIG. 10 is a partially sectioned perspective view. It is evident that the receiving spaces 5 of the first receiving part 3 are arranged offset in the connected state of the first receiving part 3, which is connected to the other adjacent receiving part 4, relative to the receiving spaces 5 of the other receiving part. The through-passage openings of the first receiving part 3 are therefore axially aligned with the contacting poles 2a of the energy storage device 2 arranged in the other receiving part 4. Accordingly, the described integrally joined contacting of respective contacting poles 2a, 2b with the connecting part 6 or the formation of corresponding contacting regions 9 is thus rendered possible.

The purpose and the function of the receiving-side connecting elements 10, 11 is further explained in particular in FIG. 3, 4. The corresponding connecting elements 10, 11, which are formed in the connecting state of the first receiving part 3 in which it is connected with the adjacently connected surfaces of another receiving part 4, are used to create a plug-in connection between the first receiving part 3 and the other receiving part 4. The formation of the plug-in connection and thus also a simple and correct positioning of the respective receiving parts 3, 4 relative to the each other is thus enabled with the interaction between the respective connecting element 10, 11.

On the other receiving part 4 in the connected state of the first receiving part 3 with the receiving part 4 connected through the base surface opposite the receiving part 3 are formed in a diagonal arrangement connecting elements 10. On the base surface of the first receiving part 3 which is connected with the further receiving part 4, corresponding connecting elements 11 are similarly provided in the connected state of the first receiving part 3 with the opposite surface of other receiving part 4 in the form of peg-like or pin-like plug-in projections.

Figure 11:
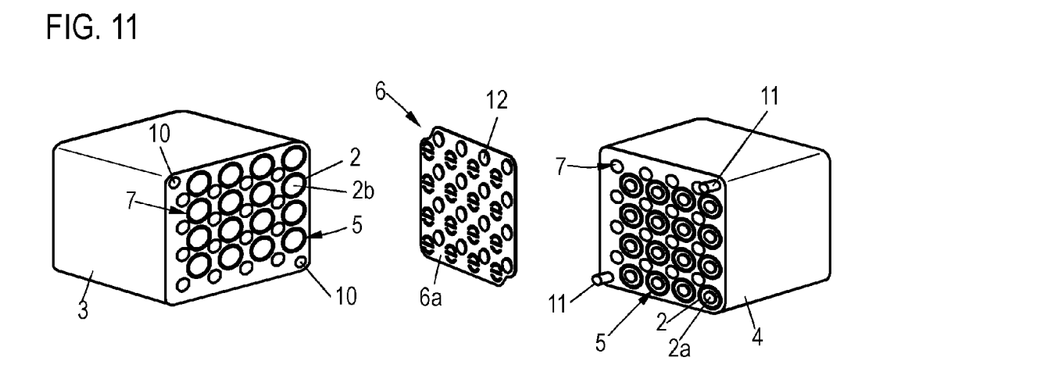
FIG. 11 the figures show a schematic representation of one step of a method for manufacturing an energy storage device arrangement according to an embodiment of the invention.
Figure 12:
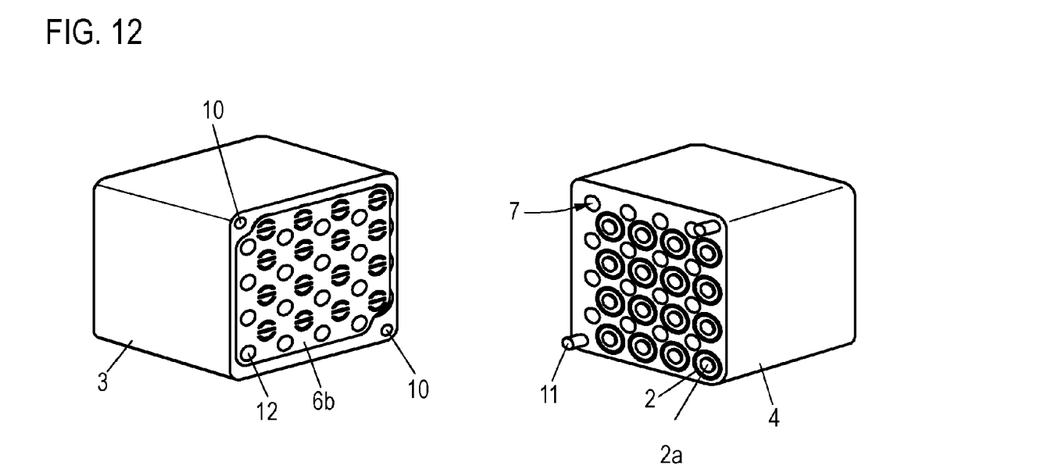
FIG. 12 the figures show a schematic representation of one step of a method for manufacturing an energy storage device arrangement according to an embodiment of the invention.
Figure 13:
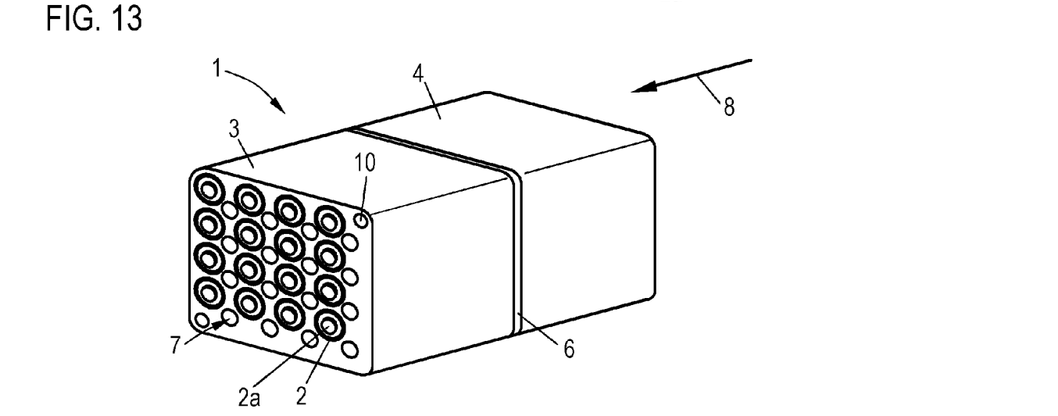
FIG. 13 the figures show a schematic representation of one step of a method for manufacturing an energy storage device arrangement according to an embodiment of the invention.

A detailed description of the method to manufacture an energy arrangement 1 will now be provided with reference to FIGS. 11-13, which respectively indicate a schematic representation of one step of a method for manufacturing an energy storage device arrangement according to one embodiment of the invention.

Within the context of the method, the components required for the formation of the energy storage device arrangement are first prepared in a first step. Therefore, a first receiving part 3, another receiving part 4 to be connected to it, and a connecting part 6 to be arranged between the first receiving part 3 and the other receiving part 4, are prepared.

In a second step, the respective storage devices 2 are arranged in the respective receiving-side receiving spaces 5.

As shown in FIG. 11, the energy storage devices 2 are already arranged in the respective receiving spaces 5 on the receiving-part side.

In a third step is carried out the electrical contacting of the exposed contacting poles 2b of the energy storage devices 2 arranged in the first receiving part 3 with the connecting part 6 by forming contacting regions 9 which contact the contacting poles 2b with the connecting part 6 in an integrally joined manner by means of laser energy 8 (see FIG. 9, 10), wherein the laser energy 8 is guided through the respective through-passage openings 7 in the first receiving part 3. As shown in FIG. 12, the contacting of the energy storage device-side contacting poles 2b with the connecting part 6 has already occurred.

In a fourth step is carried out the electrical contacting of the exposed contacting poles 2a of the energy storage devices 2 arranged in the other receiving part 4 with the connecting part 6 by forming contacting regions 9, which contact the contacting poles 2a that are integrally joined with the connecting part 6 by means of laser energy 8, wherein the laser energy 8 is guided through the through-passage openings 7 in the second receiving part 4 (see FIG. 13).

Although an energy storage device arrangement 1 that has only two receiving parts 3, 4 is shown in the figures, it is in principle also possible that the energy storage device arrangement 1 can comprise more than two receiving parts. In this case, there are different arrangement possibilities for the respective receiving parts 3, 4. A first receiving part and another receiving part 4, which is connected to it in the direction of the longitudinal axis of the receiving part-side receiving spaces 5, can form a group of receiving parts. A plurality of such part groups can be arranged next to each other parallel to the longitudinal axis of the receiving spaces 5 of the first receiving part 3.

The invention claimed is:
1. An energy storage device arrangement, comprising:
a first receiving part having a plurality of first bore-like receiving spaces for respectively receiving a first plurality of electrical energy storage devices;
a second receiving part that is or can be connected with the first receiving part, having a plurality of second bore-like receiving spaces for respectively receiving a second plurality of electric energy storage devices,
wherein each of the first plurality of electrical energy storage devices and the second plurality of electrical energy storage devices have a front contacting pole on a first face and a rear contacting pole on a second face;
at least one plate-like electrical connecting part, which is or can be arranged between the first receiving part and the second receiving part that are or can be arranged adjacently, for electrical contacting of the first plurality of electrical energy storage devices and the second plurality of electric energy storage devices,
wherein the first and second receiving parts are or can be arranged adjacently in such a way that the front contacting poles of each of the first plurality of electrical storage devices are proximate the at least one plate-like electrical connecting part and the rear contacting poles of each of the second plurality of electrical energy storage devices are proximate the at least one plate-like electrical connecting part; and
a plurality of first separate through-openings in the first receiving part and a plurality of second separate through-openings in the second receiving part for the through-passage of laser energy, wherein all the plurality of the first bore-like receiving spaces is wholly arranged so as to be distributed in a matrix-like manner forming a first matrix arrangement, all the plurality of the second bore-like receiving spaces is wholly arranged so as to be distributed in the matrix-like manner forming a second matrix arrangement, and the first matrix arrangement is wholly offset relative to the second matrix arrangement, the at least one plate-like electrical connecting part includes a first contacting region which the front contacting poles of each of the first plurality of electrical storage devices are proximate and a second contacting region which the rear contacting poles of each of the second plurality of electrical energy storage devices are proximate, and the first contacting region is offset relative to the second contacting region.

2. The energy storage device arrangement according to claim 1, wherein the first plurality of electrical energy storage devices and the second plurality of energy storage devices are in each case provided with a cylindrical shape.

3. The energy storage device arrangement according to claim 1, wherein the plurality of respective first and second separate through-passage openings are arranged so as to be distributed in a matrix-like manner in a second plurality of rows and columns.

4. The energy storage device arrangement according to claim 1, wherein the plate-like electrical connecting element is formed from a metal.

5. The energy storage device arrangement according to claim 1, wherein the plate-like electrical connecting part has an indentation formed therein for accommodating the front contacting pole from any of the electrical energy storage devices.

6. The energy storage device arrangement according to claim 1, wherein at least one slit-shaped perforation is formed in the plate-like connecting part in the area of at least one of the first contacting region and the second contacting region.

7. The energy storage device arrangement according to claim 1, wherein the first and second receiving parts are respectively formed from a plastic material.

8. The energy storage device arrangement according to claim 1, wherein the first receiving part and the second receiving part are connected to form a receiving part group, wherein a plurality of such receiving part groups are arranged next to each other parallel to a longitudinal axis of the plurality of first bore-like receiving spaces of the first receiving part.

9. The energy storage device arrangement according to claim 1, wherein the first and second receiving parts have a cube-shaped design, wherein the respective first and second bore-like receiving spaces are formed respectively at an angle, so that the respective first and second bore-like receiving spaces extend completely to a base surface of the respective first and second receiving part.

10. The energy storage device arrangement according to claim 1, wherein in a connected state of the first receiving part in which it is connected with the second receiving part arranged adjacently at least one first element of the first receiving part and at least one second element of the second receiving part are formed to create a plug-in connection between the first receiving part and the second receiving part.

11. The energy storage device arrangement according to claim 10, wherein the at least one first element of the first receiving part is in the form of a plug and the at least one second element of the second receiving part is in the form of a peg-like or pin-like projection that may be inserted into the at least one first element.

* * * * *